(12) United States Patent
Niinami

(10) Patent No.: US 8,599,268 B2
(45) Date of Patent: Dec. 3, 2013

(54) IMAGE CAPTURING APPARATUS, METHOD OF DETECTING TRACKING OBJECT, AND COMPUTER PROGRAM PRODUCT

(75) Inventor: Norikatsu Niinami, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 455 days.

(21) Appl. No.: 13/089,742

(22) Filed: Apr. 19, 2011

(65) Prior Publication Data

US 2011/0261225 A1 Oct. 27, 2011

(30) Foreign Application Priority Data

Apr. 23, 2010 (JP) ................................. 2010-099936

(51) Int. Cl.
*H04N 5/225* (2006.01)

(52) U.S. Cl.
USPC ........... 348/169; 348/345; 348/170; 348/171; 348/172

(58) Field of Classification Search
USPC .......................................... 348/169–172, 345
See application file for complete search history.

(56) References Cited

U.S. PATENT DOCUMENTS

2003/0081130 A1* 5/2003 Cho ........................... 348/211.4
2007/0263904 A1* 11/2007 Muramatsu ................... 382/107

FOREIGN PATENT DOCUMENTS

| EP | 1 225 769 A2 | 7/2002 |
| EP | 1 746 459 A1 | 1/2007 |
| JP | 5-80248 A | 4/1993 |
| JP | 2009-177503 A | 8/2009 |

\* cited by examiner

*Primary Examiner* — Roberto Velez
*Assistant Examiner* — Yih-Sien Kao
(74) *Attorney, Agent, or Firm* — Dickstein Shapiro LLP

(57) ABSTRACT

An image signal processing unit partitions a frame image into a plurality of partitioned blocks and calculates for each partitioned block luminance information, color information, contrast information, and a motion vector quantity. A grouping unit groups the partitioned blocks into an image area of the same object based on the luminance information and the color information of each partitioned block. A moving amount calculating unit calculates a moving amount of an object contained in a grouped image area based on the motion vector quantity of each partitioned block, a detection value of a motion detection sensor, and a focal length calculated by a focal length calculating unit. A tracking object selecting unit selects an object in the image area of the highest contrast value as a tracking target object out of objects each having a moving amount exceeding a threshold value.

9 Claims, 9 Drawing Sheets

PREVIOUS FRAME IMAGE

CURRENT FRAME IMAGE

IMAGE CAPTURING APPARATUS, METHOD OF DETECTING TRACKING OBJECT, AND COMPUTER PROGRAM PRODUCT

CROSS-REFERENCE TO RELATED APPLICATIONS

The present application claims priority to and incorporates by reference the entire contents of Japanese Patent Application No. 2010-099936 filed in Japan on Apr. 23, 2010.

BACKGROUND OF THE INVENTION

1. Field of the Invention

The present invention relates to an image capturing apparatus, a method of detecting tracking object, and a computer program product.

2. Description of the Related Art

In image capturing apparatuses typified by video cameras and digital cameras, an image capturing apparatus having an object tracking function has been widespread. The object tracking function is a function to move a focus area and such in an image capturing range of the image capturing apparatus in response to the movement of a tacking target of a photographic subject to allow focus adjustment, calculation of an exposure condition, and the like to be carried out by following the moving photographic subject.

In image capturing apparatuses having this type of object tracking function, several methods of selecting a tracking target object are known including a method to set an object that is selected from an image displayed as a monitor image by the operation of a user as a tracking target, a method to set a face of a human that is detected by a face detection process for an image as a tracking target, and a method to set an object detected by an auto-focus (AF) operation as a tracking target.

For example, Japanese Patent Application Laid-open No. 2009-177503 discloses an image capturing apparatus that sets an object selected by the operation of a user as a tracking target. More specifically, in the image capturing apparatus disclosed in Japanese Patent Application Laid-open No. 2009-177503, a rectangular frame is superimposed on a view image displayed on a monitor as a moving image. When the user presses a decision button while an object is positioned inside the frame displayed in the view image, the image capturing apparatus sets the object displayed inside the frame as a tracking target object and starts the operation of object tracking.

However, in the conventional methods, the fact that the tracking target object is selected by the operation of the user, the face detection process, the AF operation, and the like makes it difficult to set the object as a tracking target unless the tracking target object is held still when selecting the object. In other words, it is difficult to select as a tracking target an object that is moving when starting up the image capturing apparatus, making it impossible to start the tracking operation with a moving object as the tracking target.

SUMMARY OF THE INVENTION

It is an object of the present invention to at least partially solve the problems in the conventional technology.

According to an aspect of the invention, there is provided an image capturing apparatus having an object tracking function, the image capturing apparatus including: an image capturing unit that obtains a frame image constituting a moving image made by successively photographing images containing an object; an image signal processing unit that partitions the frame image obtained by the image capturing unit into a plurality of blocks and calculates for each of the blocks thus obtained luminance information, color information, contrast information, and a motion vector quantity from a previous frame; a motion detection unit that detects a movement of the image capturing apparatus itself; a focal length calculating unit that calculates a focal length of the image capturing apparatus corresponding to a zooming operation; a grouping unit that groups the blocks into each of image areas presumed to be the image area of a same object based on the luminance information and the color information calculated by the image signal processing unit; a moving amount calculating unit that calculates a moving amount of an object contained in each of the image areas grouped by the grouping unit based on the motion vector quantity calculated by the image signal processing unit, the movement of the image capturing apparatus itself detected by the motion detection unit, and the focal length of the image capturing apparatus calculated by the focal length calculating unit; a contrast value calculating unit that calculates a contrast value of each of the image areas grouped by the grouping unit based on the contrast information calculated by the image signal processing unit; and a tracking object selecting unit that selects an object contained in the image area of a highest contrast value calculated by the contrast value calculating unit as a tracking target object out of objects each having a moving amount calculated by the moving amount calculating unit exceeding a given reference value.

According to another aspect of the invention, there is provided a method of detecting a tracking object executed in an image capturing apparatus having an object tracking function, the method including: obtaining a frame image constituting a moving image made by successively photographing images containing an object; partitioning the frame image obtained into a plurality of blocks, and calculating for each of the blocks thus obtained luminance information, color information, contrast information, and a motion vector quantity from a previous frame; detecting a movement of the image capturing apparatus itself; calculating a focal length of the image capturing apparatus corresponding to a zooming operation; grouping the blocks into each of image areas presumed to be the image area of a same object based on the luminance information and the color information of each of the blocks; calculating a moving amount of an object contained in each of the image areas grouped based on the motion vector quantity of each of the blocks, the movement of the image capturing apparatus itself, and the focal length of the image capturing apparatus; calculating a contrast value of each of the image areas grouped based on the contrast information of each of the blocks; and selecting an object contained in the image area of a highest contrast value as a tracking target object out of objects each having a moving amount exceeding a given reference value.

According to still another aspect of the invention, there is provided a computer program product including a non-transitory computer-readable medium having computer-readable program codes for tracking an object performed by an image capturing apparatus, the program codes when executed causing computer to execute: obtaining a frame image constituting a moving image made by successively photographing images containing an object; partitioning the frame image obtained into a plurality of blocks, and calculating for each of the blocks thus obtained luminance information, color information, contrast information, and a motion vector quantity from a previous frame; detecting a movement of the image capturing apparatus itself; calculating a focal length of the image capturing apparatus corresponding to a zooming operation; grouping the blocks into each of image areas presumed to be the image area of a same object based on the luminance information and the color information of each of the blocks; calculating a moving amount of an object contained in each of the image areas grouped based on the motion vector quantity of each of the blocks, the movement of the image capturing apparatus itself, and the focal length of the image capturing apparatus; calculating a contrast value of each of the image areas grouped based on the contrast information of each of the blocks; and selecting an object contained in the image area of a highest contrast value as a tracking target object out of objects each having a moving amount exceeding a given reference value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image capturing apparatus and a method of detecting a tracking object according to the present invention will be explained in detail with reference to accompanying drawings below. While a digital camera to which the present invention is applied is exemplified in the following explanation, the invention can be widely applied to any types of image capturing apparatuses having an object tracking function.

Figure 1:
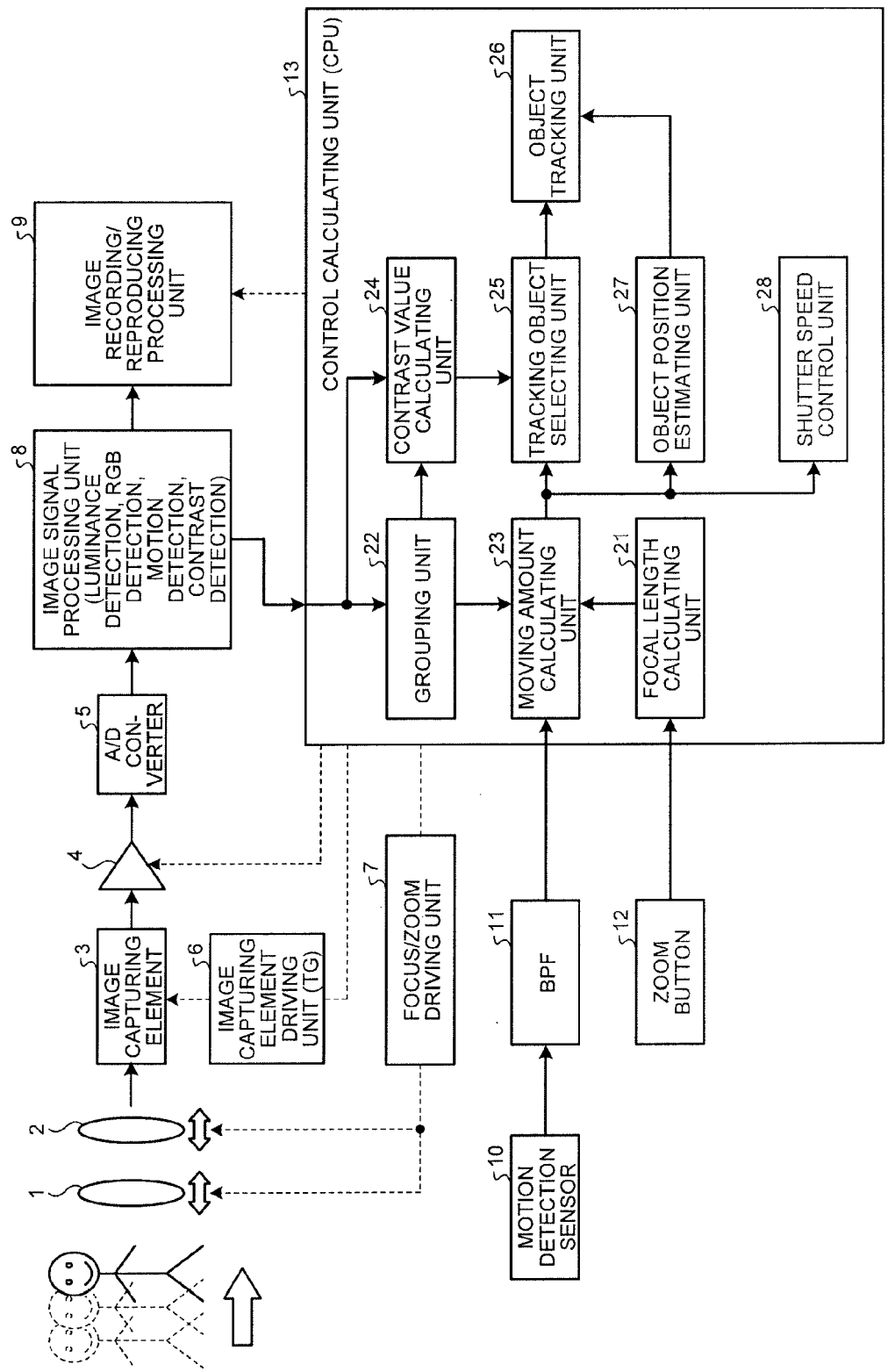
FIG. 1 is a block diagram illustrating an overall structure of a digital camera according to an embodiment of the invention.

FIG. 1 is a block diagram illustrating an overall structure of a digital camera according to an embodiment of the invention. The digital camera according to the present embodiment is provided with, as depicted in FIG. 1, an image capturing optical system including a zoom lens 1 and a focusing lens 2, an image capturing section including an image capturing element 3, an amplifier 4, and an A/D converter 5, an image capturing element driving unit (TG) 6, a focus/zoom driving unit 7, an image signal processing unit 8, an image recording/reproducing processing unit 9, a motion detection sensor 10, a band pass filter (BPF) 11, operation members including a zoom button 12, and a control calculating unit (CPU) 13.

The zoom lens 1 and the focusing lens 2 of the image capturing optical system are structured to be movable in the optical axis direction thereof by the drive of the focus/zoom driving unit 7. The zoom lens 1 and the focusing lens 2 focus incident light on a light receiving surface of the image capturing element 3 as an optical image. In this case, the zoom lens 1 and the focusing lens 2 move to their appropriate positions to adjust the focal length and the focus position of the digital camera.

The image capturing element 3 is an image sensor that converts the optical image focused on the light receiving surface to an electrical signal by a photoelectric conversion function to output the signal and, as for the element, a CMOS sensor, a CCD sensor, or the like is used. The image capturing element 3 is driven corresponding to a drive timing signal output from the image capturing element driving unit (TG) 6 under the control of the control calculating unit (CPU) 13. The electrical signal output from the image capturing element 3 is converted to digital data by the A/D converter 5 after being processed by correlated double sampling and such through which its gain is adjusted by the amplifier 4. In a shooting stand-by state in which the shutter button of the digital camera is not yet pressed, image data of a frame image constituting a moving image is output from the A/D converter 5 and fed to the image signal processing unit 8. On the other hand, in a shooting state in which the shutter button of the digital camera is pressed, the image data of a still image is output from the A/D converter 5 and fed to the image signal processing unit 8.

The image signal processing unit 8 partitions the frame image received from the A/D converter 5 in the shooting stand-by state into a plurality of blocks and calculates for each of the partitioned blocks four kinds of parameters of luminance information, color information, contrast information, and a motion vector quantity from a previous frame and outputs the calculated parameters to the control calculating unit (CPU) 13 as image information. The detail of the process by the image signal processing unit 8 will be explained later.

The image recording/reproducing processing unit 9, under the control of the control calculating unit (CPU) 13, carries out processes such as recording the image data of a still image input to the image signal processing unit 8 from the A/D converter 5 in a recording medium such as a memory card and reproducing the image data of a still image recorded in the recording medium to display the still image on a monitor screen of the digital camera. In the shooting stand-by state, the image recording/reproducing processing unit 9 carries out the process of displaying a moving image for monitoring on the monitor screen of the digital camera based on the image data of the frame image input to the image signal processing unit 8 from the A/D converter 5.

The motion detection sensor 10 is provided fixed to the housing of the digital camera or inside thereof, and detects two-dimensional movement of the digital camera in the horizontal direction and in the vertical direction. The detection value of the motion detection sensor 10 is fed to the control calculating unit (CPU) 13 through the band pass filter (BPF) 11.

The zoom button 12 is an operation member with which a user operates when conducting a zooming operation of the digital camera. In response to the operation of the zoom button 12, the control calculating unit (CPU) 13 activates the focus/zoom driving unit 7 to move the zoom lens 1 in the optical axis direction, thereby adjusting the focal length of the digital camera. In addition, the control calculating unit (CPU)

13 can calculate the focal length corresponding to the zooming operation of the digital camera in real time based on the operation amount of the zoom button 12.

The control calculating unit (CPU) 13 comprehensively controls the overall operation of the digital camera based on a control program and control data stored, for example, in a ROM not depicted. More specifically, the control calculating unit (CPU) 13 controls the image capturing element driving unit (TG) 6, the focus/zoom driving unit 7, the amplifier 4, the image recording/reproducing processing unit 9, and the like, so that, in response to an operational instruction and such of the user using various operation members, an image corresponding to the instruction can be appropriately photographed, displayed, or recorded.

In the digital camera according to the present embodiment in particular, as depicted in FIG. 1, the control calculating unit (CPU) 13 is provided with functional components of a focal length calculating unit 21, a grouping unit 22, a moving amount calculating unit 23, a contrast value calculating unit 24, a tracking object selecting unit 25, an object tracking unit 26, an object position estimating unit 27, and a shutter speed control unit 28. Based on the processes realized by the respective functional components, the control calculating unit (CPU) 13 selects an object of tracking target from the frame image output from the A/D converter 5 in the shooting stand-by state using the four kinds of parameters calculated by the image signal processing unit 8, the detection value of the motion detection sensor 10, and the operation signal of the zoom button 12, and thus carries out an object tracking operation.

The object tracking function by the digital camera according to the present embodiment will be described in detail below. The object tracking function is executed, for example, by the user selecting an object tracking mode from a plurality of photographing modes provided to the digital camera using the operation member.

Figure 2:
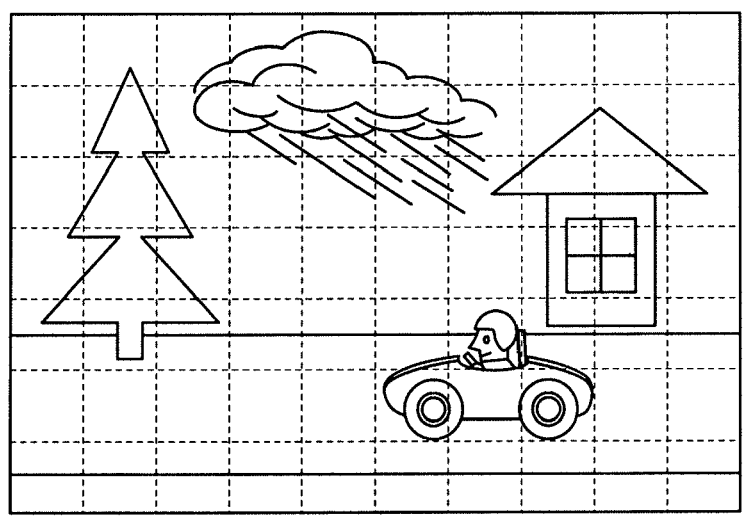
FIG. 2 is a diagram illustrating a way to partition a frame image into a plurality of partitioned blocks.

When the object tracking mode is selected as the photographing mode of the digital camera, as depicted in FIG. 2, the image signal processing unit 8 partitions the frame image output from the A/D converter 5 in the shooting stand-by state into a plurality of partitioned blocks: A partitions horizontally and B partitions vertically. For each of the partitioned blocks, the following four kinds of parameters are then obtained.

(1) Luminance Information

A luminance signal (Y) is generated from the image data of the frame image received and the luminance information for each of the partitioned blocks is calculated.

Luminance information for each partitioned block: Y(1, 1) to Y(A, B)

(2) Color Information

Hue signals (R/G/B) are generated from the image data of the frame image received and the color information for each of the partitioned blocks is calculated.

Red component information for each partitioned block: R(1, 1) to R(A, B)

Green component information for each partitioned block: G(1, 1) to G(A, B)

Blue component information for each partitioned block: B(1, 1) to B(A, B)

(3) Contrast Information

A filtering process is performed to the luminance signal (Y) generated from the image data of the frame image received, and a filter output value (C) thus obtained for each of the partitioned blocks is used as contrast information for each partitioned block. The larger the filter output value is, the higher the contrast of the image is determined to be.

Contrast information for each partitioned block: C(1, 1) to C(A, B)

(4) Motion Vector Quantity

Figure 3A:
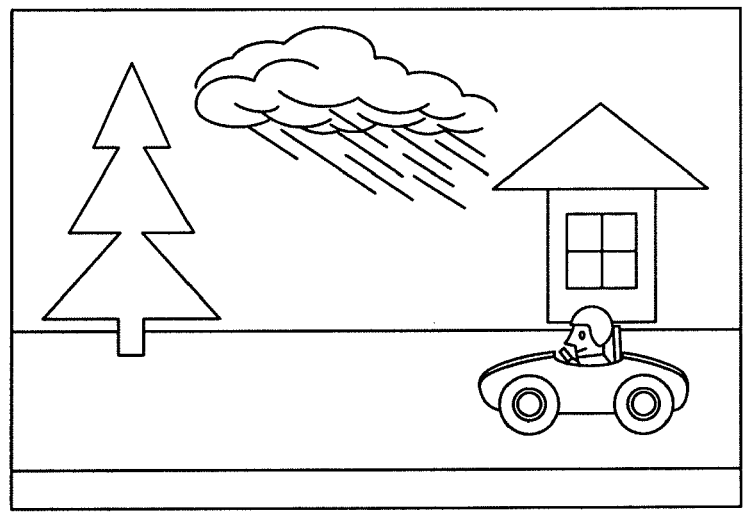
FIGS. 3A and 3B are diagrams illustrating a way to calculate a motion vector quantity for each of the partitioned blocks.
Figure 3B:
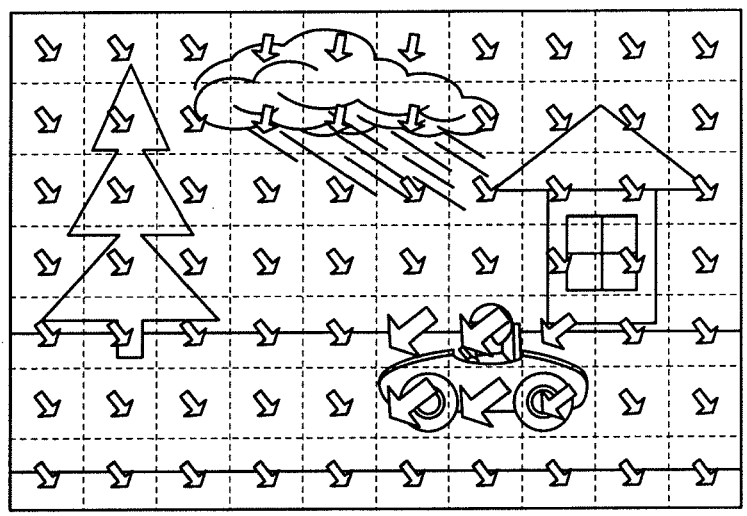

For the image data of the frame image received, as depicted in FIGS. 3A and 3B, a motion vector between two successive frames is obtained and the motion vector quantities both in the horizontal direction and in the vertical direction are calculated for each of the partitioned blocks. The motion vector quantity thus calculated is the resultant of the moving amount of the object in the image and the moving amount generated by the movement of the digital camera itself due to camera shake, panning, or the like. The arrows indicated in FIG. 3B represent the actual motion vectors for the respective partitioned blocks. The method of calculating the motion vector between the frames is a known technique and thus, its explanation is omitted.

Motion vector quantity in horizontal direction for each partitioned block: H(1, 1) to H(A, B)

Motion vector quantity in vertical direction for each partitioned block: V(1, 1) to V(A, B)

The parameters (1) to (4) calculated by the image signal processing unit 8 are sent to the control calculating unit (CPU) 13 as the image information. In the control calculating unit (CPU) 13, the grouping unit 22 first performs the analysis of distribution state of the (1) luminance information and the (2) color information in the image, and the multiple partitioned blocks are then grouped into image areas that are each presumed to be an image area of the same object (or a background).

Figure 4A:
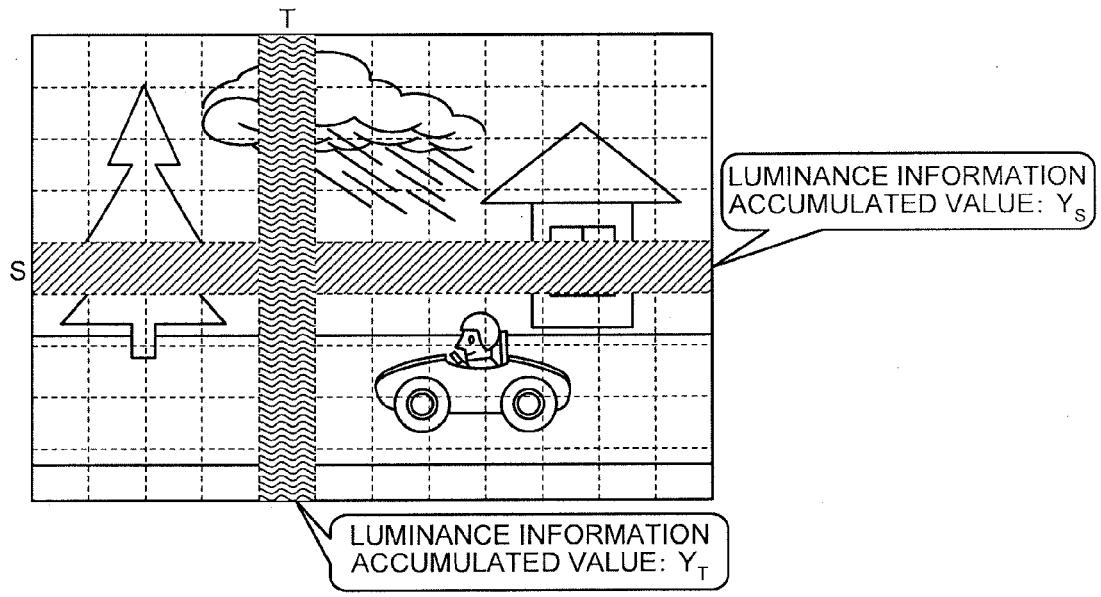
FIGS. 4A and 4B are diagrams illustrating a way to group the partitioned blocks based on luminance information.
Figure 4B:
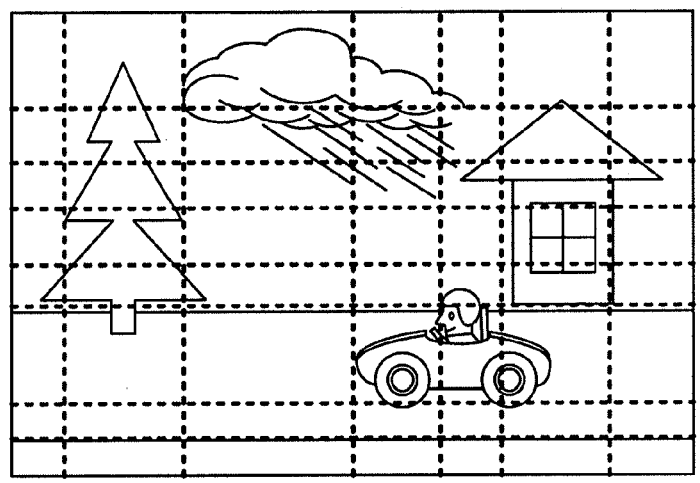

The grouping unit 22 first determines the similarity of adjacent blocks in luminance level using the (1) luminance information calculated by the image signal processing unit 8 and combines the partitioned blocks that are determined to be similar in luminance level. More specifically, as illustrated in FIG. 4A, the luminance information is accumulated for each of the partitioned blocks lining up at the same position in the horizontal direction and in the vertical direction. Those partitioned blocks that have their difference in accumulated luminance value being less than a given threshold value are combined as the same group. For example, when the luminance information accumulated value of an S-th (S-th line) partitioned block in the vertical direction is defined as $Y_S$, the luminance information accumulated value of an (S+1)-th ((S+1)-th line) partitioned block in the vertical direction is defined as $Y_{S+1}$, and the determination threshold value of similarity is defined as $\alpha$, and if $|Y_S-Y_{S+1}| \leq \alpha$ holds true, the partitioned block in S-th line and the partitioned block in (S+1)-th line are combined. In a similar manner, when defining the luminance information accumulated value of a T-th (T-th row) partitioned block in the horizontal direction as $Y_T$, the luminance information accumulated value of a (T+1)-th ((T+1)-th row) partitioned block in the horizontal direction as $Y_{T+1}$, and the determination threshold value of similarity as $\beta$, if $|Y_T-Y_{T+1}| \leq \beta$ holds true, the partitioned block in T-th row and the partitioned block in (T+1)-th row are combined. Consequently, as indicated in FIG. 4B, the partitioned blocks constituting the frame image are grouped by the similarity in luminance information.

Figure 5A:
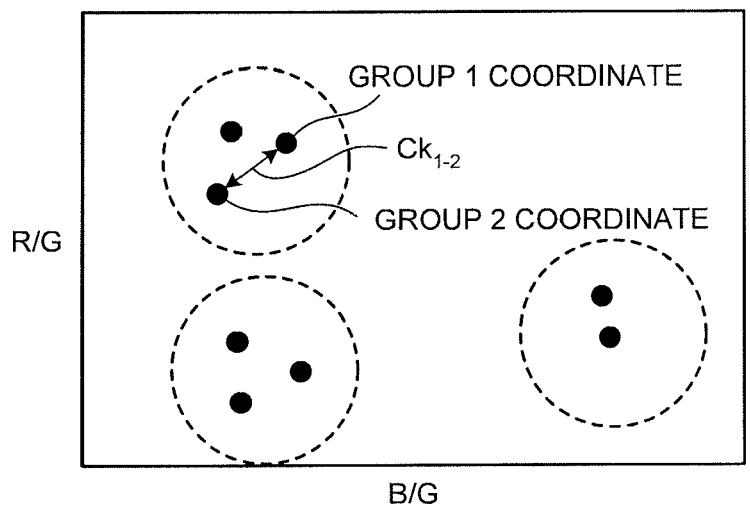
FIGS. 5A and 5B are diagrams illustrating a way to group the groups, which are grouped based on the luminance information, based on color information.
Figure 5B:
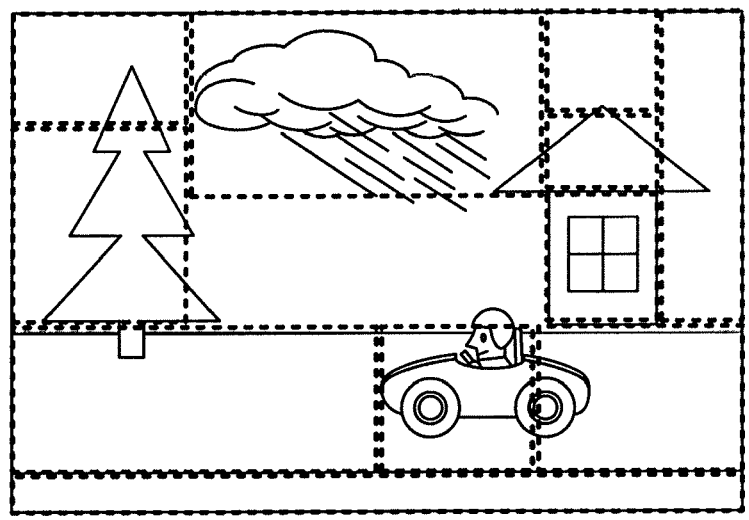

The grouping unit 22 then carries out further grouping of each of the groups, which are grouped by the similarity in luminance information, by the similarity in color information using the (2) color information calculated by the image signal processing unit 8. More specifically, for each of the groups grouped by the luminance information, the color information of each partitioned block constituting a group is accumulated as the color information of the group. As indicated in FIG. 5A, the color information of each of the groups is then mapped on a B/G to R/G coordinate and the distance between two points representing the color information of two adjacent groups is obtained. When the distance between the two points representing the color information of the two adjacent groups is equal to or less than a given threshold value γ, those two adjacent groups are combined. Consequently, as indicated in FIG. 5B, the groups that have been grouped by the similarity in luminance information are further grouped by the similarity in color information.

More specifically, for example, assuming that group 1 and group 2 grouped by the similarity in luminance information are adjacent to each other, the color information of each of the partitioned blocks constituting the group 1 is accumulated in respective components of R, G, and B, and their results are defined as the color information R1, G1, and B1, respectively, of the group 1. In the same manner, the color information of each of the partitioned blocks constituting the group 2 is accumulated in respective components of R, G, and B, and their results are defined as the color information R2, G2, and B2, respectively, of the group 2. Then, the position coordinates of the color information of the group 1 and the color information of the group 2 on the B/G to R/G coordinate are obtained as follows.

Coordinate of group 1: (B1/G1, R1/G1)
Coordinate of group 2: (B2/G2, R2/G2)

The distance $Ck_{1-2}$ between the two points representing the color information of these group 1 and group 2 is obtained as follows.

$$x=(B1/G1-B2/G2)^2+(R1/G1-R2/G2)^2$$

$$Ck_{1-2}=\sqrt{x}$$

If $Ck_{1-2} \leq \gamma$ holds true, the group 1 and the group 2 are determined to have similar hues to each other and these two adjacent groups are combined into a single group.

In a similar manner, for each of the groups grouped by the luminance information, adjacent groups are combined by the color information.

Then, the moving amount calculating unit 23 carries out the process of calculating the movement of an object contained in each of the image areas grouped by the grouping unit 22 by the luminance information and the color information, based on the (4) motion vector quantity calculated by the image signal processing unit 8, the detection value of the motion detection sensor 10, and the focal length of the digital camera calculated by the focal length calculating unit 21. The focal length calculating unit 21 calculates the focal length of the digital camera in real time corresponding to the operation amount of the zoom button 12 by the user.

Figure 6:
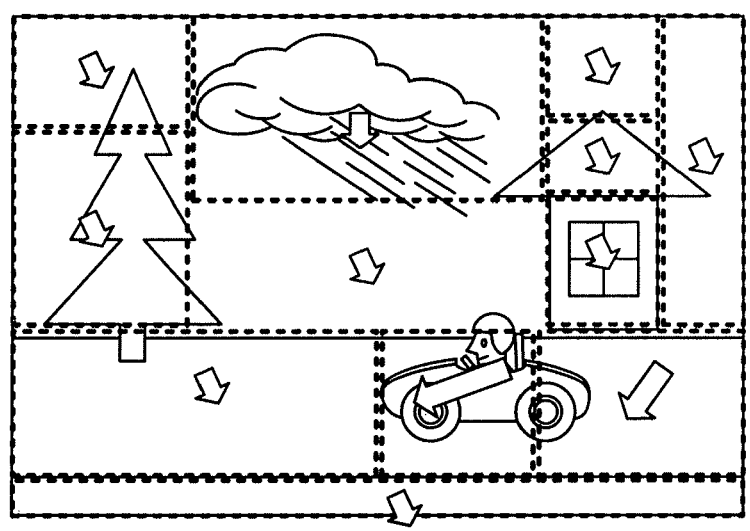
FIG. 6 is a diagram illustrating a way to calculate a motion vector of each of grouped image areas.

The moving amount calculating unit 23, using the (4) motion vector quantity calculated by the image signal processing unit 8, as indicated in FIG. 6, obtains the average value of the motion vector quantities of the partitioned blocks constituting an image area for each of the image areas grouped by the grouping unit 22. Each average value of the motion vector quantities thus obtained is defined as the motion vector for each of the image areas. The arrows indicated in FIG. 6 represent the motion vectors of the respective image areas grouped by the grouping unit 22. For example, when the motion vector quantities in the horizontal direction of the partitioned blocks constituting an image area N grouped by the grouping unit 22 are defined as H0, H1, ..., and Hm, the motion vector quantities in the vertical direction of the partitioned blocks constituting the image area N are defined as V0, V1, ..., and Vm, and the number of partitioned blocks constituting the image area N is defined as $Bk_N$, the motion vector value $MH_N$ of the image area N in the horizontal direction and the motion vector value $MV_N$ in the vertical direction are obtained as follows.

$$MH_N = \sum_{n=0}^{m} Hn/Bk_N:$$

Average value of motion vector quantities of partitioned blocks in image area N in horizontal direction $$MV_N = \sum_{n=0}^{m} Vn/Bk_N:$$

Figure 7:
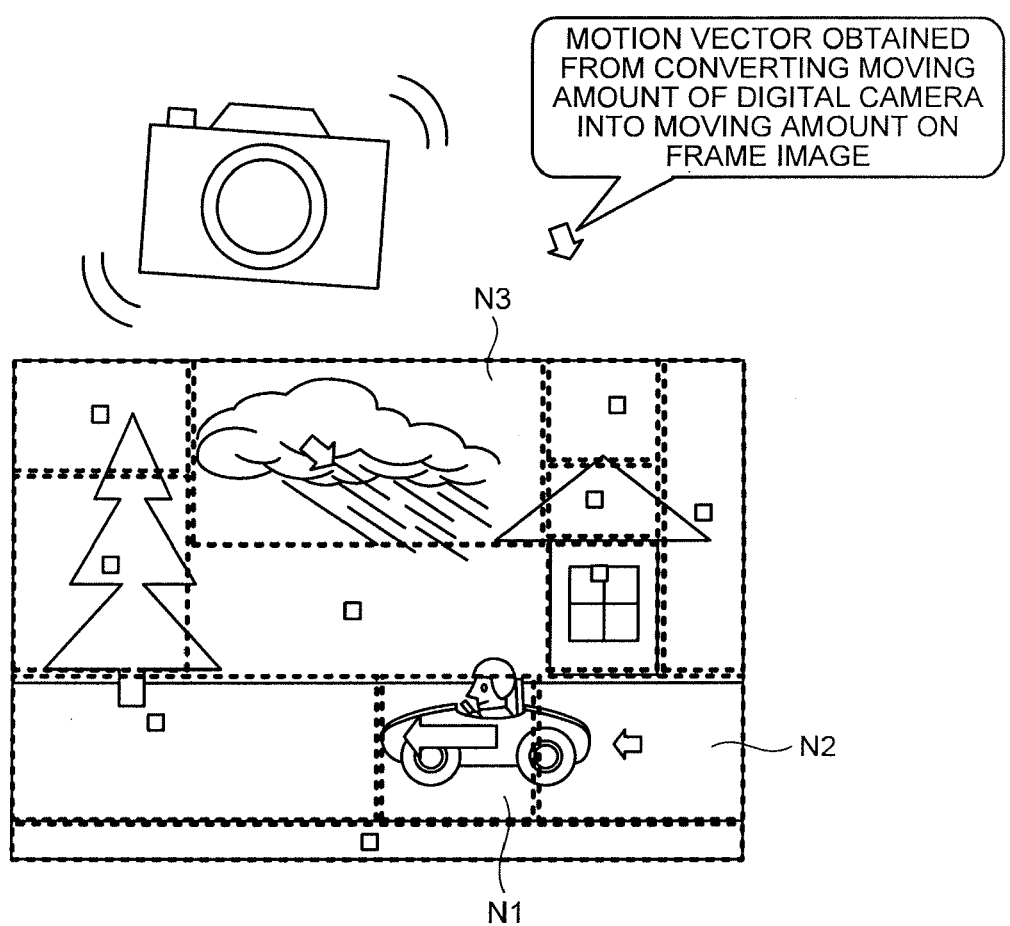
FIG. 7 is a diagram illustrating a way to calculate a moving amount of an object contained in each of the grouped image areas.

Average value of motion vector quantities of partitioned blocks in image area N in vertical direction The motion vector of each of the image areas thus calculated is the resultant of the moving amount of the object contained in each of the image areas and the movement of the digital camera itself. Accordingly, the moving amount calculating unit 23 calculates the moving amount of an object contained in each of the image areas, as illustrated in FIG. 7, by subtracting the moving amount of the digital camera itself from the motion vector of each of the image areas thus calculated.

More specifically, when calculating the moving amount $V_N$ of an object in the image area N, by defining the moving amount of the digital camera detected by the motion detection sensor 10 in the horizontal direction as GH, its moving amount in the vertical direction as GV, and the current focal length of the digital camera calculated by the focal length calculating unit 21 as $Z_N$, the moving amount in the frame image by the movement of the digital camera in the horizontal direction is expressed as $GH \times Z_N$. The moving amount in the frame image by the movement of the digital camera in the vertical direction is expressed as $GV \times Z_N$. Accordingly, the moving amount $IH_N$ of the object in the image area N in the horizontal direction and the moving amount $IV_N$ of the object in the vertical direction are obtained as follows.

$$IH_N = MH_N - (GH \times Z_N)$$

$$IV_N = MV_N - (GV \times Z_N)$$

The moving amount $V_N$ of the object in the image area N is obtained as follows.

$$x=(IH_N)^2+(IV_N)^2$$

$$V_N=\sqrt{x}$$

By the calculations in the foregoing, the moving amount of an object contained in each of the image areas grouped by the grouping unit 22 is calculated.

Meanwhile, the contrast value calculating unit 24, using the (3) contrast information calculated by the image signal processing unit 8, carries out the process of calculating a contrast value of each of the image areas grouped by the grouping unit 22. More specifically, the contrast value calculating unit 24, using the (3) contrast information calculated by the image signal processing unit 8, obtains the average value of contrast information of the partitioned blocks constituting an image area for each of the image areas grouped by the grouping unit 22. The average value of the contrast information thus obtained is defined as the contrast value of the image area. For example, when the contrast information of the partitioned blocks constituting the image area N grouped by the grouping unit 22 is defined as C0, C1, . . . , and Cm, and the number of partitioned blocks constituting the image area N is defined as $Bk_N$, the contrast value $MC_N$ of the image area N is obtained as follows.

$$MC_N = \sum_{n=0}^{m} Cn/Bk_N:$$

Average contrast value of partitioned blocks in image area N

The tracking object selecting unit 25, based on the moving amount of an object contained in each of the image areas calculated by the moving amount calculating unit 23 and the contrast value of each of the image areas calculated by the contrast value calculating unit 24, carries out the process of selecting a tracking target object. Specifically, the tracking object selecting unit 25 extracts an object that has a moving amount calculated by the moving amount calculating unit 23 exceeding a given threshold value θ as a candidate for the tracking object. For example, when the moving amount of the object in the image area N is defined as $V_N$, and if $V_N > \theta$ holds true, the object contained in the image area N is made to be a candidate for the tracking target. In the example depicted in FIG. 7, each of the objects in the image areas N1, N2, and N3 are extracted as the candidates for the tracking target.

The tracking object selecting unit 25 then selects, out of the image areas of the objects selected as the candidates for the tracking target, the object in the image area that renders a maximum contrast value calculated by the contrast value calculating unit 24 as the tracking target object to be actually tracked. In the example illustrated in FIG. 7, when the contrast value of the image area N1 is defined as $MC_{N1}$, the contrast value of the image area N2 is defined as $MC_{N2}$, and the contrast value of the image area N3 is defined as $MC_{N3}$, and if $MC_{N2} < MC_{N3} < MC_{N1}$ holds true, an automobile that is the moving object contained in the image area N1 is selected as the tracking target object.

By a series of the processes above, the tracking target object is selected from the frame image constituting the moving image. When the tracking target object is selected, the object tracking operation is started by the object tracking unit 26. More specifically, the object tracking unit 26, for example, calculates the amount of characteristic as an image of the object selected as the tracking target and holds it as object information. In a subsequent frame image, the object tracking unit 26 sets a search range and searches an object that can be presumed to be the same object as the tracking target object in the set search range based on the object information. At the position of the tracking target object in the frame image, a focusing area is set and an AF control that focuses on the tracking target object is carried out. Furthermore, an AE control that calculates an exposure condition corresponding to the brightness of the image of the tracking target object is carried out.

As described in the foregoing, the digital camera according to the present embodiment uses the information of the luminance information, the color information, the contrast information, and the motion vector for each of the partitioned blocks in a frame image constituting a moving image, the movement of the digital camera itself due to camera shake, panning, or the like, and the focal length of the digital camera corresponding to the zooming operation so as to adequately detect a moving object in the frame image and to select it as the tracking target object. This allows the moving object to be set as the tracking target object without relying on the operation of the user, whereby the object tracking operation can be carried out.

Meanwhile, when the object tracking operation is carried out, normally, a search range of the object is set in a successive frame image centering on the position of the object detected from the current frame image. However, when a moving object is set as a tracking target as in the digital camera according to the present embodiment, and if the moving amount of the object is large, the object position in the subsequent frame image may be out of the search range, thereby degrading the accuracy of search. If the search range is expanded to improve the search accuracy, the processing load required for the object tracking operation may become excessive. Therefore, the digital camera according to the present embodiment is provided with the object position estimating unit 27, in the control calculating unit (CPU) 13, as a function to estimate the position of the tracking target object in the subsequent frame image based on the moving amount of the object calculated by the moving amount calculating unit 23. The object tracking unit 26 then sets the search range centering on the position estimated by the object position estimating unit 27 to carry out the process of searching the tracking target object from the set search range.

Figure 8:
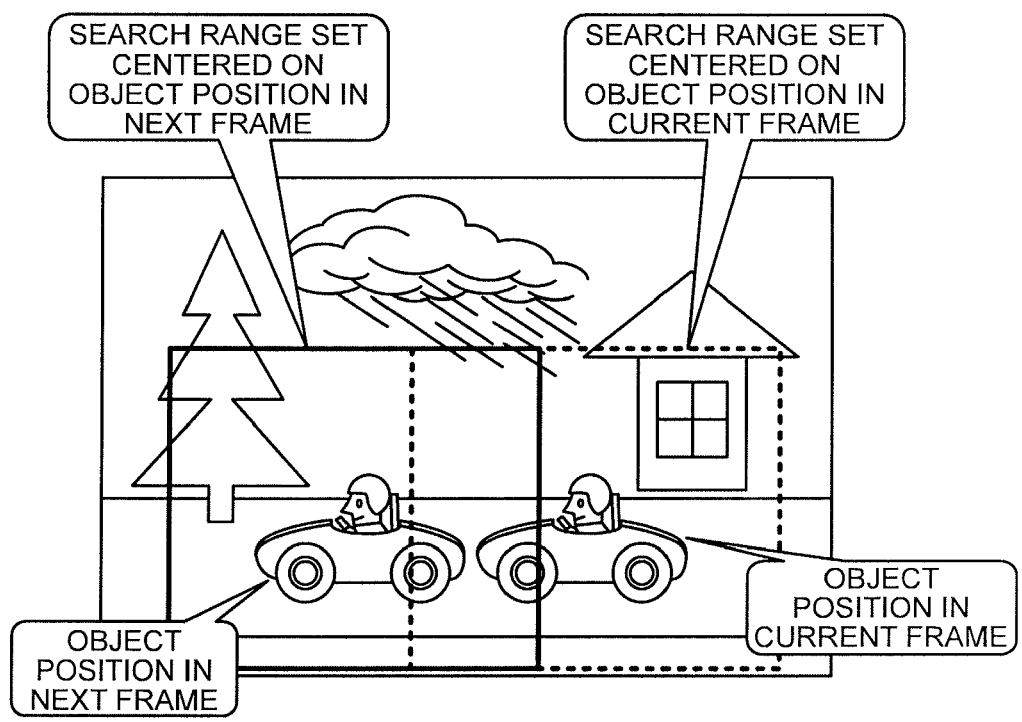
FIG. 8 is a diagram illustrating a way to set a search of a tracking target object.

The moving amount calculating unit 23 continues to calculate the moving amount of the tracking target object for each frame even after the object tracking operation is started by the object tracking unit 26. The moving amounts of the object in the past frames calculated by the moving amount calculating unit 23 are stored in a memory as necessary. The object position estimating unit 27, for example, reads the moving amounts of the object from the memory for the past P frames tracing back from the current frame and calculates their average value to set it as the estimated value of the moving amount for the subsequent frame image. The object position estimating unit 27, as illustrated in FIG. 8, then estimates the object position in the subsequent frame image to be the position that is moved from the object position in the current frame by the moving amount of the estimated value. For example, when the moving amounts of the object for the past P frames tracing back from the current frame are defined as $V_N 0, V_N 1, \ldots,$ and $V_N P$, the moving amount $V_{N\_AVG}$ of the object in the subsequent frame image is obtained as follows.

$$V_{N\_AVG} = \sum_{n=0}^{P} V_N(n)/(P+1)$$

When the position of the object in the current image is defined as $P_N 0$, the position of the object in the subsequent frame image $P_N F$ is obtained as follows.

$$P_N F = P_N 0 + V_{N\_AVG}$$

The object tracking unit 26, as indicated in FIG. 8, sets the search range of the object in the subsequent frame image centering on the object position estimated by the object position estimating unit 27. This makes it possible to improve the accuracy of the object search performed by the object tracking unit 26, thereby allowing even a fast moving object to be adequately tracked. Furthermore, the fact that the accuracy of the search range is improved allows the search range to be narrowed down to a small area, thereby reducing the processing load required for the object tracking operation and thus, speeding up the process.

Figure 9A:
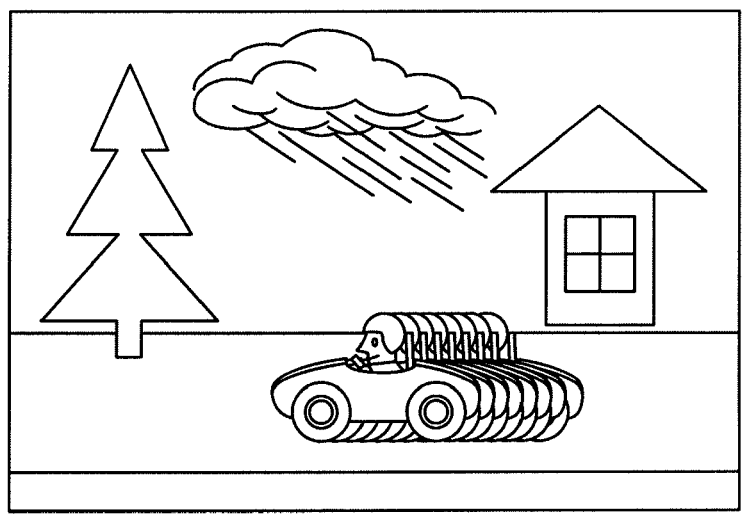
FIGS. 9A and 9B are diagrams illustrating a way to reduce blurring of an object by setting a shutter speed fast when the moving speed of the object is fast.

In the digital camera according to the present embodiment that defines a moving object as a tracking target, when a still image is photographed at the shutter speed calculated by the AE control, and if the moving speed of the object is fast, as illustrated in FIG. 9A, the image of the object may be blurred in a photographed still image. Therefore, the digital camera according to the present embodiment is provided, in the control calculating unit (CPU) 13, with the shutter speed control unit 28 as a function to control the shutter speed at the time of photographing a still image based on the moving amount of the object calculated by the moving amount calculating unit 23.

Figure 9B:
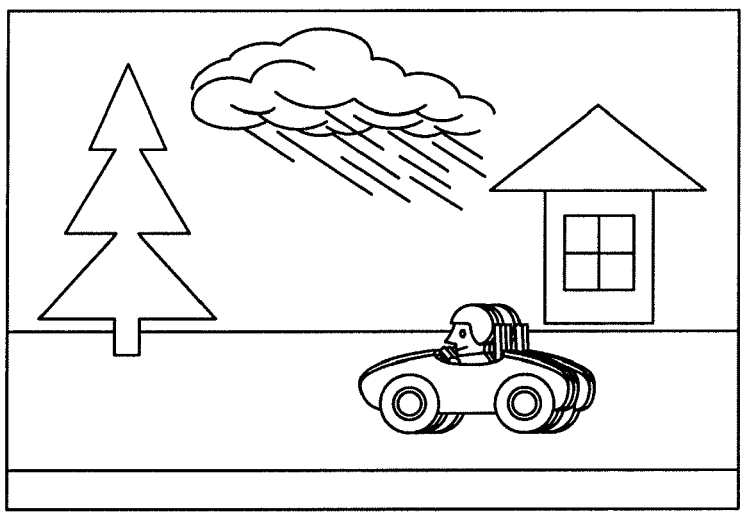

The shutter speed control unit 28 estimates the moving amount of the object in the subsequent frame image by carrying out a similar calculation to that of the object position estimating unit 27 based on the moving amount of the object calculated by the moving amount calculating unit 23. Alternatively, the shutter speed control unit 28 may obtain the estimated value of the moving amount of the object in the subsequent frame image calculated by the object position estimating unit 27. The shutter speed control unit 28 then controls the shutter speed at the time of photographing a still image corresponding to the moving amount of the object thus estimated when the shutter button of the digital camera is pressed by the user to photograph the still image by the image capturing element 3. More specifically, the shutter speed control unit 28 controls the shutter speed at the time of photographing the still image such that the larger the moving amount of the object is, the faster the shutter speed becomes. This makes it possible to photograph the still image of the object with reduced blur, as illustrated in FIG. 9B, even when the moving speed of the object is fast. When the shutter speed is made faster by the shutter speed control unit 28, it is desirable that the aperture value calculated by the AE control be made faster (an opening degree of an iris is made larger) or the gain of signal amplification (ISO sensitivity) of the amplifier 4 be increased corresponding to the shutter speed made shorter. This allows the still image to be photographed under the condition that an adequate exposure is maintained.

While the exemplary embodiment of the present invention applied to the digital camera has been described in the foregoing, the present invention is not limited to such embodiment only, but can be embodied in implementation with modification of the constituent elements without departing from the scope of aspects of the present invention. For example, in the embodiment above, the grouping unit 22 of the control calculating unit (CPU) 13 carries out the grouping based on the color information after the grouping based on the luminance information of each of the partitioned blocks constituting a frame image is carried out. However, the grouping based on the luminance information may be carried out after the grouping based on the color information, or the grouping may be carried out by comprehensively determining the degrees of similarities in the luminance information and in the color information.

According to the present invention, the fact that a moving object is adequately detected from a frame image constituting a moving image and selected as a tracking target leads to an effect that the tracking operation can be started by setting the moving object as the tracking target.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing apparatus having an object tracking function, the image capturing apparatus comprising:
   an image capturing unit that obtains a frame image constituting a moving image made by successively photographing images containing an object;
   an image signal processing unit that partitions the frame image obtained by the image capturing unit into a plurality of blocks and calculates for each of the blocks thus obtained luminance information, color information, contrast information, and a motion vector quantity from a previous frame;
   a motion detection unit that detects a movement of the image capturing apparatus itself;
   a focal length calculating unit that calculates a focal length of the image capturing apparatus corresponding to a zooming operation;
   a grouping unit that groups the blocks into each of image areas presumed to be the image area of a same object based on the luminance information and the color information calculated by the image signal processing unit;
   a moving amount calculating unit that calculates a moving amount of an object contained in each of the image areas grouped by the grouping unit based on the motion vector quantity calculated by the image signal processing unit, the movement of the image capturing apparatus itself detected by the motion detection unit, and the focal length of the image capturing apparatus calculated by the focal length calculating unit;
   a contrast value calculating unit that calculates a contrast value of each of the image areas grouped by the grouping unit based on the contrast information calculated by the image signal processing unit; and
   a tracking object selecting unit that selects an object contained in the image area of a highest contrast value calculated by the contrast value calculating unit as a tracking target object out of objects each having a moving amount calculated by the moving amount calculating unit exceeding a given reference value.

2. The image capturing apparatus according to claim 1, further comprising:
   an object position estimating unit that estimates a position of the tracking target object in a subsequent frame image based on the moving amount calculated by the moving amount calculating unit; and
   an object tracking unit that sets a search range centering on a position estimated by the object position estimating unit and searches the tracking target object from the search range thus set.

3. The image capturing apparatus according to claim 1, further comprising a shutter speed control unit that controls a shutter speed in photographing a still image based on the moving amount of the tracking target object calculated by the moving amount calculating unit.

4. A method of detecting a tracking object executed in an image capturing apparatus having an object tracking function, the method comprising:
   obtaining a frame image constituting a moving image made by successively photographing images containing an object;
   partitioning the frame image obtained into a plurality of blocks, and calculating for each of the blocks thus obtained luminance information, color information, contrast information, and a motion vector quantity from a previous frame;
   detecting a movement of the image capturing apparatus itself;
   calculating a focal length of the image capturing apparatus corresponding to a zooming operation;

grouping the blocks into each of image areas presumed to be the image area of a same object based on the luminance information and the color information of each of the blocks;

calculating a moving amount of an object contained in each of the image areas grouped based on the motion vector quantity of each of the blocks, the movement of the image capturing apparatus itself, and the focal length of the image capturing apparatus;

calculating a contrast value of each of the image areas grouped based on the contrast information of each of the blocks; and selecting an object contained in the image area of a highest contrast value as a tracking target object out of objects each having a moving amount exceeding a given reference value.

5. The method of detecting tracking object according to claim 4, further comprising:

estimating a position of the tracking target object in a subsequent frame image based on the moving amount calculated; and setting a search range centering on the position estimated and searching the tracking target object from the search range thus set.

6. The method of detecting tracking object according to claim 4, further comprising controlling a shutter speed in photographing a still image based on the moving amount of the tracking target object calculated.

7. A computer program product including a non-transitory computer-readable medium having computer-readable program codes for tracking an object performed by an image capturing apparatus, the program codes when executed causing computer to execute:

obtaining a frame image constituting a moving image made by successively photographing images containing an object;

partitioning the frame image obtained into a plurality of blocks, and calculating for each of the blocks thus obtained luminance information, color information, contrast information, and a motion vector quantity from a previous frame;

detecting a movement of the image capturing apparatus itself;

calculating a focal length of the image capturing apparatus corresponding to a zooming operation;

grouping the blocks into each of image areas presumed to be the image area of a same object based on the luminance information and the color information of each of the blocks;

calculating a moving amount of an object contained in each of the image areas grouped based on the motion vector quantity of each of the blocks, the movement of the image capturing apparatus itself, and the focal length of the image capturing apparatus;

calculating a contrast value of each of the image areas grouped based on the contrast information of each of the blocks; and selecting an object contained in the image area of a highest contrast value as a tracking target object out of objects each having a moving amount exceeding a given reference value.

8. The computer program product according to claim 7, further the program codes when executed causing computer to execute:

estimating a position of the tracking target object in a subsequent frame image based on the moving amount calculated; and setting a search range centering on the position estimated and searching the tracking target object from the search range thus set.

9. The computer program product according to claim 7, further the program codes when executed causing computer to execute controlling a shutter speed in photographing a still image based on the moving amount of the tracking target object calculated.

* * * * *